United States Patent
Gkoulalas-Divanis et al.

(10) Patent No.: US 9,230,132 B2
(45) Date of Patent: Jan. 5, 2016

(54) ANONYMIZATION FOR DATA HAVING A RELATIONAL PART AND SEQUENTIAL PART

(71) Applicant: International Business Machines Corporation, Armonk, NY (US)

(72) Inventors: Aris Gkoulalas-Divanis, Dublin (IE); Guenter A. Sauter, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 14/132,945

(22) Filed: Dec. 18, 2013

(65) Prior Publication Data
US 2015/0169895 A1   Jun. 18, 2015

(51) Int. Cl.
*G06F 21/00* (2013.01)
*G06F 21/62* (2013.01)

(52) U.S. Cl.
CPC .................... *G06F 21/6227* (2013.01)

(58) Field of Classification Search
USPC ....................................... 726/26–30
See application file for complete search history.

(56) References Cited

U.S. PATENT DOCUMENTS

| | | |
|---|---|---|
| 8,112,422 B2 | 2/2012 | Srivastava et al. |
| 2008/0222319 A1* | 9/2008 | Sato et al. ............ 710/34 |

FOREIGN PATENT DOCUMENTS

| | | |
|---|---|---|
| EP | 2416271 | 8/2012 |
| GB | 2485783 | 5/2012 |

OTHER PUBLICATIONS

"ARGUS version 4.2 User's Manual", Project: ESSnet-project, Date: Dec. 2008, Statistics Netherlands, P.O. Box 24500, 2490 HA The Hague, The Netherlands.
Loukides et al., "COAT: COnstraint-based ananymization of transactions", Knowl Int Syst (2011) 28:251-282, Published online: Nov. 3, 2010 Springer-Verlag London Limited 2010.
Poulis et al., "Anonymizing data with relational and transaction attributes", Machine Learning and Knowledge Discovery in Databases, Lecture Notes in Computer Science vol. 8190, 2013, European Conference, ECML PKDD 2013, Prague, Czech Republic, Sep. 23-27, 2013, pp. 353-369.
Fung et al., "Privacy-Preserving Data Publishing: A Survey of Recent Developments", ACM Computing Surveys, vol. 42, No. 4, Article 14, Jun. 2010.
Li et al., "Anonymizing Streaming Data for Privacy Protection", ICDE 2008, IEEE 24th Conference on Data Engineering, Apr. 7-12, 2008, pp. 1367-1369.

(Continued)

*Primary Examiner* — Ghazal Shehni
(74) *Attorney, Agent, or Firm* — Scully, Scott, Murphy & Presser, P.C.; Jeff Tang, Esq.

(57) ABSTRACT

A system, method and computer program product for anonymizing data. Datasets anonymized according to the method have a relational part having multiple tables of relational data, and a sequential part having tables of time-ordered data. The sequential part may include data representing a "sequences-of-sequences". A "sequence-of-sequences" is a sequence which, itself, consists of a number of sequences. Each of these kinds of data may be anonymized using k-anonymization techniques and offers privacy protection to individuals or entities from attackers whose knowledge spans the two (or more) kinds of attribute data.

20 Claims, 6 Drawing Sheets

(56) References Cited

OTHER PUBLICATIONS

Tamersoy et al., "Anonymization of Longitudinal Electronic Medical Records", IEEE Transactions on Information Technology in Biomedicine, vol. 16, No. 3, May 2012, pp. 413-423.

Zhou, "Preserving Privacy in Social Networks Against Neighborhood Attacks", IEEE 24th International Conference on Data Engineering, Apr. 7-12, 2008, pp. 506-515.

Abul et al., "Never Walk Alone: Uncertainty for Anonymity in Moving Objects Databases", IEEE 24th International Conference on Data Engineering, Apr. 7-12, 2008, pp. 376-385.

Freitas, "A Critical Review of Multi-Objective Optimization in Data Mining: a position paper", ACM SIGKDD Explorations Newsletter, vol. 6, Issue 2, Dec. 2004, pp. 77-86.

Shang et al., "(k,P)-Anonymity: Towards Pattern-Preserving Anonymity of Time-Series Data", CIKM'10, Oct. 26-30, 2010, Toronto, Ontario, Canada, pp. 1333-1336.

Sweeney, "Guaranteeing Anonymity when Sharing Medical Data, the Datafly System", Proc AMIA Annu Fall Symp, Oct. 25-29, 1997.

Terrovitis et al., "Privacy-preserving Anonymization of Set-valued Data", VLDB '08, Aug. 24-30, 2008, Auckland, New Zealand.

Sweeney, "k-Anonymity: A Model for Protecting Privacy", International Journal on Uncertainty, Fuzziness and Knowledge-based Systems, 10 (5), 2002; pp. 557-570, received May 2002.

Samarati, "Protecting Respondents' Identities in Microdata Release", IEEE Transactions on Knowledge and Data Engineering, vol. 13, Issue 6, Nov./Dec. 2001, pp. 1010-1027.

Jiang et al., "t-Plausibility: Semantic Preserving Text Sanitization", 2009 International Conference on Computational Science and Engineering, vol. 3, Aug. 29-31, 2009, pp. 68-75.

He et al., "Anonymization of Set-Valued Data via Top-Down, Local Generalization", VLDB '09, Aug. 24-28, 2009, Lyon, France.

\* cited by examiner

| PID | Full Name | Social Security Number | Date of Birth | Gender | Ethnicity |
|---|---|---|---|---|---|
| 3857 | Tom | 59286 | 10/3/1979 | Male | Irish |
| 2145 | John | 34836 | 15/7/1982 | Male | Italian |
| 2172 | Susan | 46824 | 19/2/1964 | Female | American |
| 1285 | Bob | 32134 | 23/4/1980 | Male | Irish |
| 3264 | Helen | 62324 | 17/9/1970 | Female | American |

FIG. 2B

| PID | Bank Account Number | Last Trans. Date | Last Trans. Amount | Balance |
|---|---|---|---|---|
| 3857 | 103684 | 25/9/2009 | $765 | $213 |
| 2145 | 103261 | 27/7/2010 | $813 | $0 |
| 2172 | 104573 | 29/9/2011 | $1118 | $23.11 |
| 1285 | 103286 | 30/5/2008 | $917 | $0 |
| 3264 | 103127 | 27/8/2010 | $513 | $109 |

FIG. 2C

| Property ID | PID | Property Address | Sequence ID | Number of Bedrooms | Resident Marital Status | Date of Occupancy | Property Class |
|---|---|---|---|---|---|---|---|
| 958625 | 3857 | A5 | 11 | 2 | M | 20/7/2008 | A |
| 959521 | 2145 | A4 | 9 | 2 | M | 16/8/2008 | A |
| 951526 | 2172 | A3 | 7 | 3 | M | 18/5/2009 | B |
| 952662 | 1285 | A2 | 14 | 2 | M | 20/2/2007 | C |
| 958622 | 3264 | A1 | 10 | 17 | S | 24/6/2009 | D |

| | Bank Account Number | Full Name | Social Security Number | Date of Birth | Gender | Ethnicity |
|---|---|---|---|---|---|---|
| r1 | 906624 | James | 95276 | 13/11/1980 | Male | ethnicity0 |
| r2 | 902211 | Thomas | 94626 | 13/11/1980 | Male | ethnicity0 |
| r3 | 906543 | Maria | 37834 | 16/12/1971 | gender0 | ethnicity1 |
| r4 | 703725 | Peter | 92316 | 16/12/1971 | gender0 | ethnicity1 |
| r5 | 703312 | Lisa | 36372 | 16/12/1971 | gender0 | ethnicity1 |

| Resident Occupancy Information |
|---|
| (2, 1/11/05, M1, S, 1B) (10, 23/5/07, M2, M, 1B) (11, 3/8/08, M3, M, 2B) |
| (8, 1/11/05, M1, S, 1B) (10, 23/5/07, M2, M, 1B) (11, 3/8/08, M3, M, 2B) |
| (4, 8/9/06, M6, S, NB0) (7, 10/7/08, M7, MS0, NB2) |
| (6, 8/9/06, M6, S, NB0) (14, 10/7/08, M7, MS0, NB2) |
| (3, 8/9/06, M6, S, NB0) (10, 10/7/08, M7, MS0, NB2) |

(a) Intermediate 2-anonymous dataset

Date of birth
13/11/1980 -- r1 / r2 -- "10/3/1979", "15/7/1982"
21/02/1972 -- r1 / r2 -- "17/8/2007", "28/2/2007"
16/12/1971 -- r3 / r4 / r5 -- "19/2/1964", "17/9/1970", "23/4/1980"

Date of occupancy
01/11/2005 -- r1 / r2 -- "1/3/2005", "4/5/2005"
25/05/2007 -- r1 / r2 -- "17/8/2007", "28/2/2007"
03/08/2008 -- r1 / r2 -- "20/7/2008", "16/8/2008"
03/04/2006 -- r3 / r4 -- "15/3/2006", "10/2/2007"
04/04/2006 -- r3 / r4 -- "20/3/2007", "16/5/2008"
10/7/2008 -- r3 / r4 / r5 -- "20/4/2006", "4/4/2006", "24/6/2009"
08/09/2006 -- r3 / r4 / r5 -- "15/3/2005", "10/2/2007", "13/02/2007"

Number of bedrooms
NB0 -- r3 / r4 -- "1B", "2B"
NB1 -- r3 / r4 -- "2B", "2B"
NB2 -- r3 / r4 / r5 -- "1B", "2B", "3B"

House Location
M1 -- r1 / r2 -- MBR(A1, A5)
M2 -- r1 / r2 -- MBR(A5, A6)
M3 -- r1 / r2 -- MBR(A4, A5)
M4 -- r2 / r4 -- MBR(A3, A4)
M5 -- r3 / r4 -- MBR(A2, A3)
M6 -- r3 / r4 / r5 -- MBR(A2, A3, A4)
M7 -- r3 / r4 / r5 -- MBR(A1, A2, A3)

Gender
gender0 -- r1 / r2 -- "male", "female"

Ethnicity
ethnicity0 -- r1 / r2 -- "Irish", "Italian"
ethnicity1 -- r3 / r4 -- "American", "Irish"

Marital status
MS0 -- r3 / r4 / r5 -- "single", "married"

ANONYMIZATION FOR DATA HAVING A RELATIONAL PART AND SEQUENTIAL PART

FIELD OF INVENTION

This disclosure relates generally to data anonymization, and particularly, anonymization of data having relational and sequential data parts, the sequential data part possibly being a sequence-of-sequences.

BACKGROUND

In recent years, people have been witnessing a data explosion: 90% of today's data have been produced only in the last two years with the volume of information that is nowadays available being estimated in the order of Zettabytes. These data come from deployed sensors, social networking sites, mobile phone applications, call detail records, electronic medical record (EMR) systems, e-commerce sites, etc.

Analyzing this wealth and volume of data offers remarkable opportunities for growth in various business sectors for a company, e.g., including healthcare, telecommunications, banking and smarter cities management, among many others. However, the majority of these datasets are proprietary and many contain personal and/or business sensitive information. Examples of sensitive data include patient records, special housing information, tax records, customer purchases records, mobile call detail records (CDR), etc. The very sensitive nature of such datasets prohibits their outsourcing for analytic and/or other purposes, unless privacy-enhancing technology is in place to offer sufficient protection.

Among the privacy-enhancing technologies that are available nowadays, the area of privacy-preserving data publishing aims at protecting privacy at a record level. This area comprises techniques for transforming, and subsequently publishing, person-specific data in a way that sensitive information about the individuals is protected, while the data remain useful to support intended purposes. The methods in this area can be categorized into perturbative, such as data masking, noise addition, micro-aggregation, data swapping and rounding, and non-perturbative, such as data suppression and data generalization. Perturbative methods distort the original data values and thereby fail to maintain data truthfulness. Furthermore, it has been proven that they typically lead to low data utility; hence, non-perturbative methods are generally preferred. These latter non-perturbative methods operate by changing the granularity at which data values are reported in the sanitized dataset, in a way that maintains data truthfulness at a record (individual) level. Among non-perturbative methods, data generalization is usually preferred over suppression, because it leads to datasets of higher utility.

The most popular non-perturbative model for privacy-preserving data publishing is k-anonymity. This model requires that at least k records, each corresponding to an individual in a released table, have the same values over a set of potentially identifying attributes, called quasi-identifiers. Different to direct (or explicit) identifiers, such as names, social security numbers, credit card numbers, etc., which can be used in isolation to re-identify an individual, quasi-identifiers are seemingly innocuous attributes (e.g., zip code, gender, date of birth, etc.) which, when used in combination, may lead to identity disclosure. k-anonymity thwarts identity disclosure attacks by guaranteeing that an attacker cannot re-identify an individual in a released dataset, with a probability that is above 1/k, where k is an owner-specified parameter. The k-anonymity model, which was originally proposed for relational data, has been since adapted to various kinds of data, including set-valued data, mobility, longitudinal and time-series data, data streams, social graphs, and textual data, and has been implemented in several real-world systems.

Although many k-anonymity approaches have been proposed for protecting different data types, all existing solutions offer protection for a specific kind of data, e.g., for relational data tables or for transaction (set-valued) data or for social graphs or for temporal data, etc.

While it would be highly desirable to provide a single approach for anonymizing records of individuals that considers not only one specific kind of data in isolation but, instead, protecting datasets in which records comprise two different kinds of data: a relational part and a transaction (set-valued) part, such an approach is challenging. For example, assuming attackers exist who have knowledge that spans these two kinds of data, i.e., they may know certain relational attribute-value pairs (e.g., some demographics) of an individual together with some items of a set-valued attribute (e.g., a set of products that this individual has purchased). In this context, anonymizing records of individuals which comprise of two different kinds of data is a very challenging task, particularly because:

1) Anonymizing each kind of data separately (e.g., by using existing k-anonymization techniques that are relevant to this kind of data) does not offer privacy protection to the individuals from attackers whose knowledge spans the two (or more) kinds of data.
2) Constructing an optimal solution with minimum information loss is an NP-hard problem.
3) Popular multi-objective optimization strategies, such as the lexicographic approach, the conventional weighted-formula or a Pareto optimal approach, are not applicable to these problems. In fact, good anonymization decisions that are taken on one kind of data may be proven disastrous for the other kind of data.

SUMMARY

A system, method and computer program product for anonymizing datasets that consist of a relational part and a sequential part, where the sequential part may itself consist of data representing sequences of sequences.

Such datasets are commonly met in a plethora of real-world applications, including healthcare (e.g., an electronic medical record reports both patient demographics, and medication as well as diagnoses information, which are both time-stamped) and social care (e.g., a citizen record in the special housing registry consists of both demographics and resident occupancy information, which are in the form of sequences-of-sequences).

In one embodiment, there is provided a method of anonymizing data. The method comprises: receiving at a hardware processor, input comprising a dataset having both a relational data part and a sequential data part; identifying from the dataset direct identifier attributes corresponding to the entities; masking or suppressing the identified direct identifiers attribute values; ranking records based on a similarity with respect to a defined cost function F; selecting and iteratively anonymizing each set of at least k first records as ranked using a cost function F, each set of at least k records comprising a group, the anonymizing attribute values along both the relational part and the sequential part, wherein k is a specified k-anonymization parameter; and repeating the selecting and iteratively anonymizing each successive set of at least k records of successive groups the anonymizing attribute values along both the relational part and the sequential part of records therein, wherein anonymized table representations result from the anonymization.

In one embodiment, the sequential part comprises a sequences-of-sequences data, whereby a sequence comprises at least two sequences, a sequence comprising a single event.

In a further embodiment, there is provided a system for anonymizing data. The system comprises: a memory; a hardware processor coupled to the memory for receiving instructions configuring the hardware processor to perform a method comprising: receiving, an input, the input comprising a dataset having both a relational data part and a sequential data part; identifying from the dataset direct identifier attributes corresponding to the entities; masking or suppressing the identified direct identifiers attribute values; ranking records based on a similarity with respect to a defined cost function F; selecting and iteratively anonymizing each set of at least k first records as ranked using a cost function F, each set of at least k records comprising a group, the anonymizing attribute values along both the relational part and the sequential part, wherein k is a specified k-anonymization parameter; and repeating the selecting and iteratively anonymizing each successive set of at least k records of successive groups the anonymizing attribute values along both the relational part and the sequential part of records therein, wherein anonymized table representations result from the anonymization.

As before the sequential part comprises a sequences-of-sequences data, whereby a sequence comprises at least two sequences, a sequence comprising a single event.

A computer program product is provided for performing operations. The computer program product includes a storage medium readable by a processing circuit and storing instructions run by the processing circuit for running a method. The storage medium readable by a processing circuit is not only a propagating signal. The method is the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIGS. 2A-2C each show examples of three (fictitious) relational tables used in forming the dataset shown in the table of FIG. 1A in one embodiment.

DETAILED DESCRIPTION

The present disclosure describes a system and method to anonymize datasets that include a relational part and a sequential part, where the sequential part may consist of data representing a "sequences-of-sequences". A "sequence-of-sequences" is a sequence which, itself, consists of a number of sequences. In the trivial case, a sequence can consist of only single events, e.g., S=(a, b, c) is a sequence of events "a", "b" and "c" (where each of the "a", "b", "c" is a single element/event, instead of being a sequence).

In this disclosure, domain generalization hierarchies are not required to be defined. Rather, the method employs both data generalization and data masking to conceal sensitive information for data tables residing in a database management system (DBMS), as it achieves to conform to the existing attribute types (as defined in the original tables), while offering the important benefits of data generalization.

That is, the system and method of the present disclosure is applicable for anonymizing datasets having complex semantics of sequential data (and especially of sequences-of-sequences) as compared to transactional data.

Figures 1A, 1B, 1C:
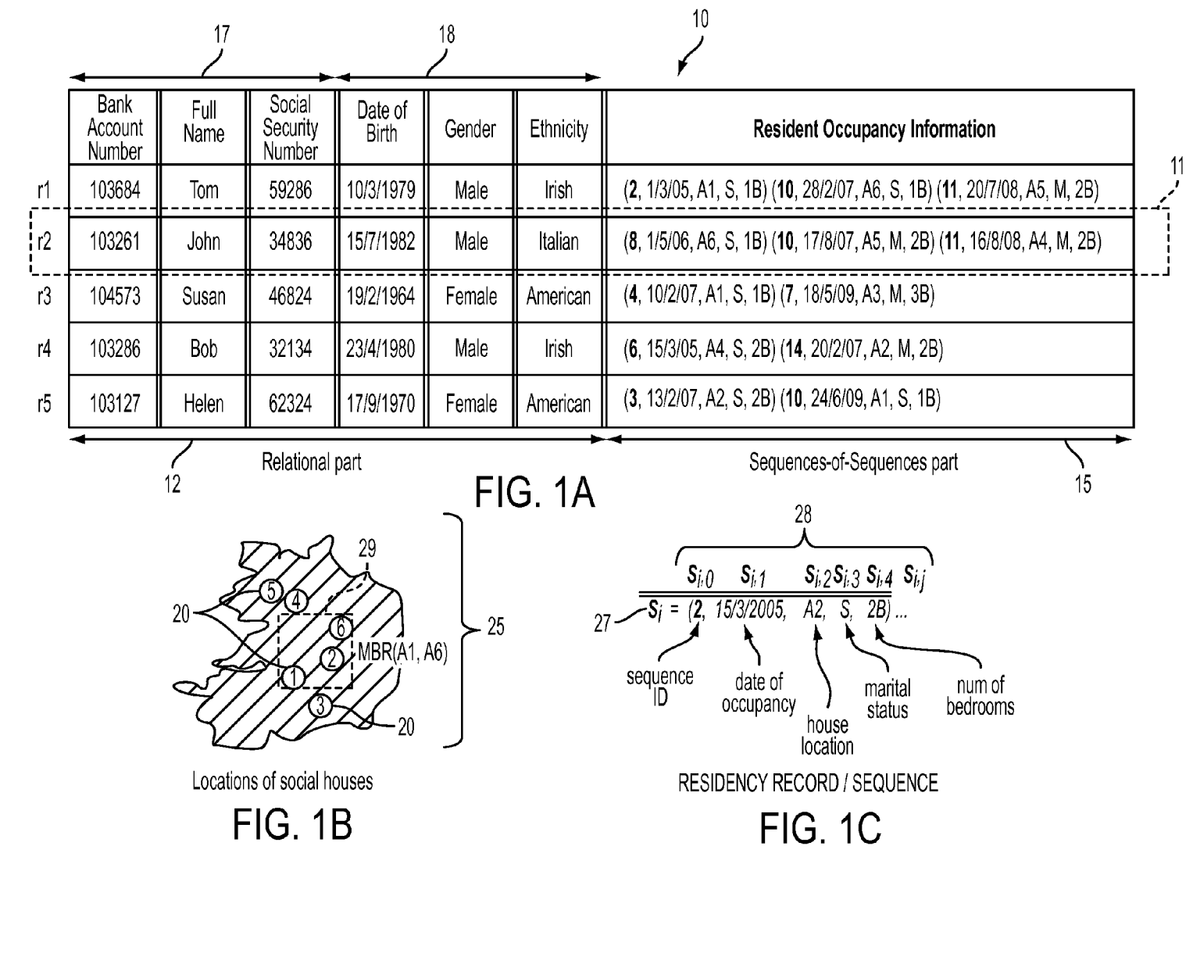
FIG. 1A shows an example dataset consisting of a relational part (attributes bank account number, full name, social security number, date of birth, gender and ethnicity) and a sequential part (resident occupancy information), where the sequential part contains sequences-of-sequences data.
FIG. 1B shows in the example dataset of FIG. 1A, the housing locations in a map.
FIG. 1C shows in the example dataset of FIG. 1, an example of the information contained in a residency record (i.e., an event of the sequence associated with an individual record) of the dataset.

In the approach described herein, there is considered an example dataset having records that include a relational part and a sequential part. Further, there is considered a "complex" scenario in which the sequential part consists of sequences of sequences. In one embodiment, a dataset of this kind includes a joined set of relational database tables stored in a storage device, e.g., database or memory. FIG. 1A depicts an example dataset being a join of database tables, e.g., by joining a set of individual relational tables such as the three relational tables shown in FIG. 2 that are related based on a "PID" key (a personal ID key) 36.

FIG. 1A particular shows an example of (a) a dataset, shown as a data table 10 of records 11, each record having a relational part 12 and a sequential part 15, where the sequential part contains sequences-of-sequences data. Such data may include event data occurring in a temporal sense (i.e., over many time points) with each point in time having an associated set of data. This table 10 shown in FIG. 1A is exemplary and represents example data associated with an entity or entities in an example domain, e.g., health care and special housing. It is noted in the example depicted that each record in FIG. 1A corresponds to a fictional individual who is offered special housing. In one non-limiting illustrative example, the data forming the sequences of sequences information may include occupancy information (an ordered list of elements) for individuals residing in special houses and that have moved between different "houses" over a period of time. It is understood that the entity or entities referred to in the examples included herein may include people or individuals however it is not so limited. The present invention may be used to anonymize data for entities such as corporations, businesses, households or other entities that maintain relational and sequential information data.

For the example described herein, FIG. 1B shows in the example dataset 10 of FIG. 1A, the locations 20 of the available special housing, e.g., designated within an area, e.g., an area "A" 25. FIG. 1C shows in the example dataset 10 of FIG.

1A, an example of the information contained in the sequential part, i.e., a residency record (i.e., an event) of the dataset.

As will be referred to herein below, an "intermediate table" (or "table" in short) includes records 18, each record corresponding to an individual. In FIG. 1A, a record 11 includes two parts: the relational part 12 and the sequential part 15, the latter of which may consist of sequences-of-sequences. The intermediate table may be generated authomatically, by combining a representation of the datasets in one table where each record corresponds to a unique individual and consists of a relational part and a sequential (optionally, sequences-of-sequences) part.

Figures 2A, 2B, 2C:
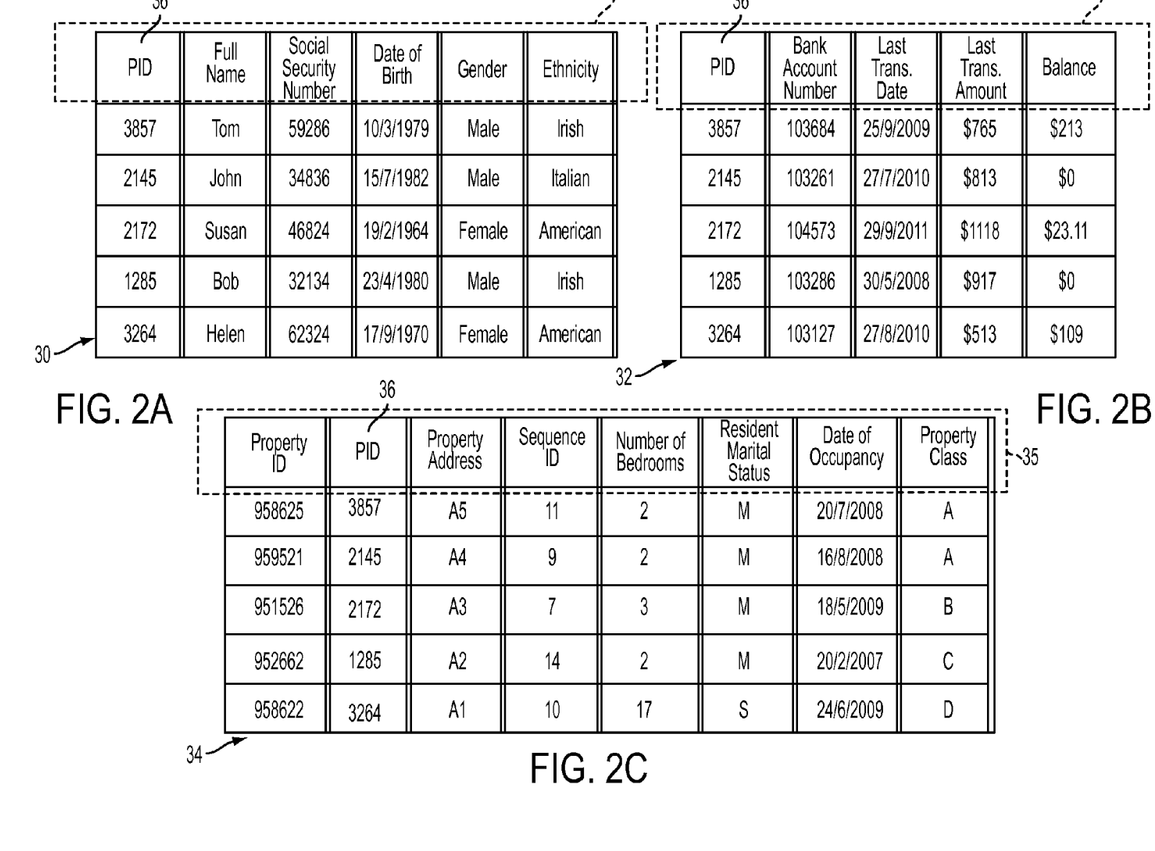
FIG. 2A shows a table containing demographics information with one record for each individual.
FIGS. 2B and 2C show tables containing longitudinal information associated with each individual. In these figures, more than one record may correspond to the same individual.

FIG. 2 shows an example of three (fictitious) relational tables 30, 32 and 34 from which the dataset comprising the intermediate table 10 shown in FIG. 1A is generated. These tables include: as shown in FIG. 2A, a first database table 30 having data in columns 31 representing various attributes about entities, e.g., individuals. In the example described herein and shown, the data indicates attributes for individuals who live in special housing in an area. FIG. 2B shows a database table 32 having data attributes 33 indicating rent transaction information, including bank account, a last transaction made and a balance per entity (individual). As further shown in FIG. 2C, a database table 34 shows for an individual a data sequence 35 indicating property details about the actual houses (e.g., in a special housing type domain) including current housing attributes and their current household occupancies. Note the attribute PID identifier 36 which relates each of the tables 30, 32, 34 for an entity (individual) along with relational attributes. In one aspect, the programmed computer combines these tables to form the intermediate table 10 of FIG. 1A prior to anonymization.

As will be referred to further herein below, in one embodiment, the relational part 12 of a record 11 includes relational attributes about the entity (e.g., individual). Some of these attributes may be unique for an individual such as the individual's name, social security number (SSN) or the bank account number. These attributes are referred to as direct or explicit identifiers. FIG. 1A indicates the direct or explicit identifiers 17 (i.e., data including an individual's full name, bank account number and a social security number) as the first three columns of intermediate table 10. Other relational attributes may not be explicit identifiers but, when their values are considered in combination, this combination may be unique for (at least) an individual in the table. These attributes are referred to as quasi-identifiers (QIDs) 18. In example relational Table 30 of FIG. 2A for example, data including an individual's date of birth, gender or ethnicity are considered quasi-identifiers. Finally, non-sensitive attributes may also exist in the relational table and these attributes do not require special handling. That is, these attributes can be published as-is since they cannot leak any sensitive information or lead to identity disclosure attacks.

As will be referred to herein below, a "sequences-of-sequences" part 15 of a record i (a record 11) may include a sequence S 27 which, itself, consists of elements 28 which are themselves part of sequences $s_i$ (see FIG. 1C for an example). Each s, has an ordered list of elements $s_{i,j}$ where "j" is an index representing a position in the sequence S of a record i. This ordering of elements is the same for all sequences S of a record i. In FIG. 1C, an example data sequence 27 such as stored in a database, includes: an example sequence 27 of five elements with a first element of an example sequence S of record i indicated as a sequence element $S_{i,0}$ representing a sequence ID (e.g., an identifier of an element of a sequence of elements representing a timeline of events); a second element indicated as a sequence element $S_{i,1}$ represents a date of occupancy (of the user) at a particular household; a third element of sequence $S_i$ indicated as a sequence element $S_{i,2}$ represents a household location (e.g., an identifier of the household); a fourth element indicated as a sequence element $S_{i,3}$ of the sequence represents a marital status of the user; and a fifth element of sequence $S_i$ indicated as a sequence element $S_{i,4}$ represents a number of bedrooms at the household location occupied. It is understood that generally, any data comprising actions taken at different times over a time period may be considered sequences-of-sequences data.

As explained in greater detail herein below, the method considers and is configured to protect against attackers who know any/all of the following:

1. the values of all explicit identifiers of an individual i or entity;
2. the values of all quasi-identifying relational attributes of an individual i or entity;
3. any sequence $s_i$ (i.e., element of sequence S) of the individual i or entity; and
4. the length of sequence S (i.e., the number of elements $s_i$ for an individual/record i).

For example, for the present example described herein directed to data sequence information pertaining to a special housing and/or health-care domain, example explicit identifiers which attacker's may know may include an individual's Full name, an individual's SSN, etc. Example quasi identifiers which attacker's may know may include an individual's date of birth, gender, ethnicity, etc. An example sequence $s_i$ which attacker's may know may include a sequence of information of a residency occupancy record (date of occupancy of the special housing, house location, marital status, number of bedrooms, etc.). An example sequence "length" which may be known by attackers may include the number of residencies that an individual has changed.

The system and method of the present disclosure offers privacy-protection from such attackers. Specifically, it guarantees that these attackers will not be able to re-identify any individual in the released dataset with a probability that is above 1/k, where k is an owner-specified parameter. Additionally, the computer-implemented system and method guarantees that the temporal order of elements in each sequence S of the original data will be preserved in the anonymized (sanitized) dataset.

Figure 3:
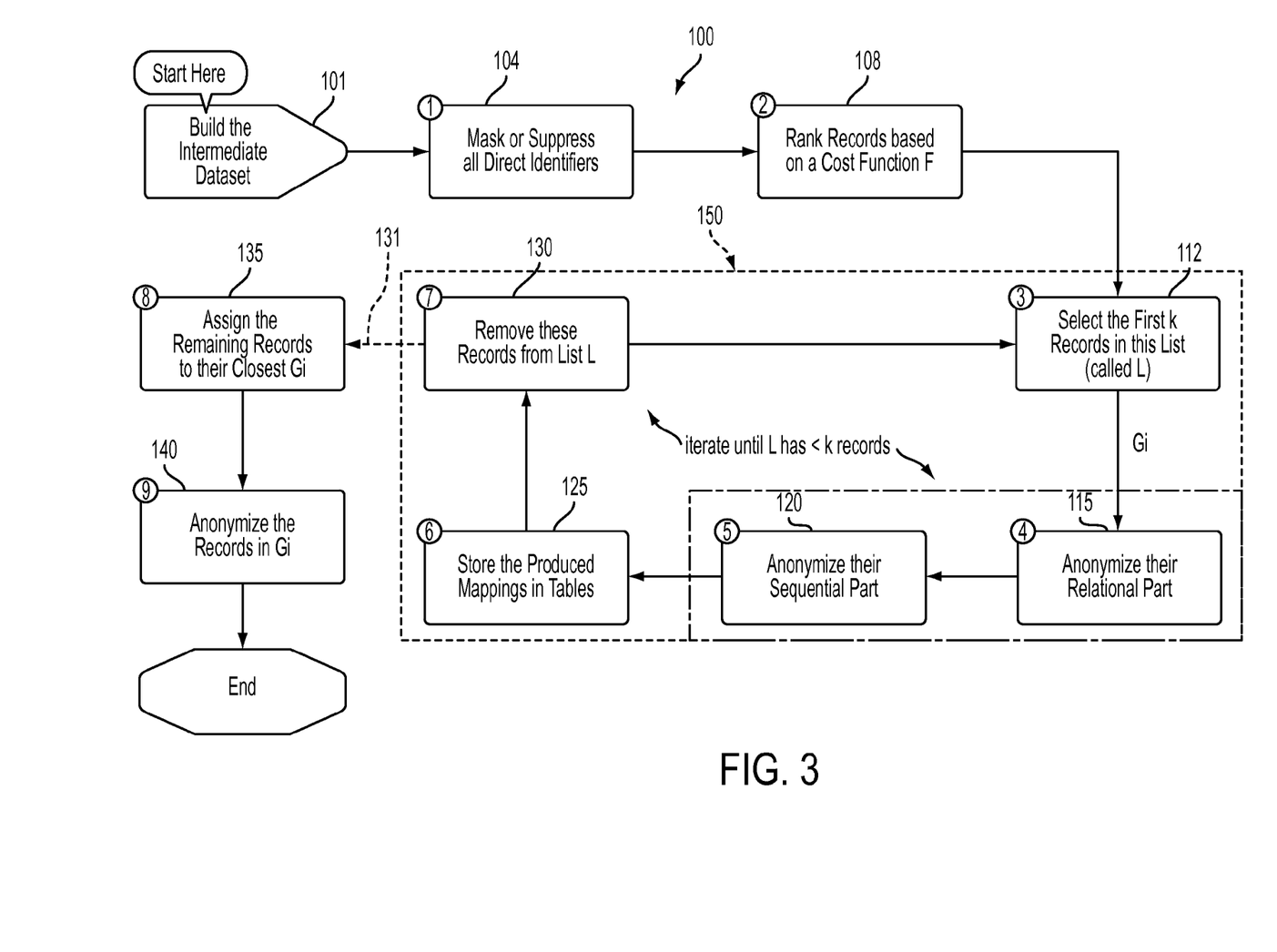
FIG. 3 depicts a general overview of the method 100 for anonymizing data in one embodiment.

FIG. 3 shows a flow graph illustrating the proposed computer implemented method 100. Such methods are performed by a computer system shown and described below with respect to FIG. 6. The method 100 implements the following steps: At step 101, there is built the aforementioned data set, e.g., a single "intermediate table" form including records 11, with each record corresponding to an individual, and with each record having the relational part 12 and the sequential part 15, the latter of which may consist of sequences-of-sequences (actions are taken at different times over a time period).

At step 104, FIG. 3, there is a first step of masking or suppressing the direct/explicit identifiers. That is, all direct/explicit identifiers are either suppressed (i.e., removed from the data table) or masked through an appropriate data masking privacy provider. Thus, in the example, suppression may include simply deleting the first three columns of the intermediate data set table 10 of FIG. 1A.

Masking may involve changing or transforming the values of the explicit identifiers, e.g., by applying a data masking function. In one embodiment, direct identifiers can be automatically found in the "intermediate table" by computing the frequency of occurrence of each value in a relational attribute. For example, the "social security number" column of 10 is a direct identifier since each record in the intermediate dataset is associated with a different value of this attribute (i.e., each individual has a unique social security number). The masked values of the direct identifiers are copied to the intermediate (anonymized) released table as described in greater detail below with respect to FIG. 4A. For example, as a result of implementing a data masking provider that generates new pseudo-account numbers, bank account numbers may be transformed. Also, using a masking provider, entity's names are replaced, e.g., the individuals names are replaced with other names that may preserve the gender information of the individual. Social security numbers may be similarly transformed to new numbers that follow the same format, etc. The result is that these explicit identifier values, if known by an attacker with knowledge, cannot be used to identify the entity.

At step 108, FIG. 3, there is then performed a computer implemented step of ranking the records. In one embodiment, the records are ranked using a cost function, which henceforth is referred to as a cost function "F". The cost function F indicated may be user specified or user selected prior to running the anonymization. Implementing a cost function will locate and produce those records that are "similar" to each other based on the information they contain, and further generate a ranking based on record similarity. In this way, similar records will be anonymized together. Different cost functions can be defined based on the analytic workloads, or other tasks, where the anonymized data will be used. Cost functions aim to reduce the uncertainty that is caused by data generalization, thus minimize the information loss incurred and maximize the utility of the anonymized dataset.

In one embodiment, a "cost" function that is implemented may be based on the number of elements $s_{ij}$, also known as length of sequence S, for record i. That is, the records are sorted in decreasing length of their respective sequences S. In the special housing example described herein, a cost function may include ranking records based on an attribute value(s), e.g., the different number of reported residencies in which someone lived (elements in a sequence). FIG. 1A shows a such as illustrated in the record ranking of FIG. 1A. The ranking process groups the data into (groupings) based on the cost function used for application of a k-anonymity approach described herein.

In a further embodiment, a cost function that is implemented is based on the proximity of values for selected relational attributes of the records. In the case of numerical attributes (or dates, timestamps, etc.) this can be measured, for example, based on the difference of the corresponding values between two records. For the case of categorical attributes, similarity can be measured based on whether the values are the same or different, or through a hierarchy (if available). As an example, if the categorical attribute contains a disease associated with each individual, then diseases "diabetes-type-I" and "diabetes-type-II" are more similar than diseases "diabetes-type-I" and "cancer". Similarity of diseases may be retrieved with the help of a hierarchy, such as the hierarchy of ICD-9 (disease) codes. Different degrees of similarity are available based on the respective locations of the nodes in the hierarchy (e.g., "diabetes-type-I" and "diabetes-type-II" are "closer" in the hierarchy than "diabetes-type-I" and "cancer"). Similarity of relational attributes can be also measured for a combination of numerical and/or categorical attributes (e.g., records that are similar based on some numerical attributes as well as for some categorical attributes). Several measures can be used that can quantify this type of similarity.

In a further embodiment, a cost function can be used to capture selected events $s_{ij}$ appearing many consecutive times in different sequences S. For example, two sequences S, S' have many consecutive elements in $s_{ij}$, $s_{ij}'$ in which a same attribute value appears, e.g., an event such as "one bedroom apartment" appears, so they involve individuals who mostly live in one bedroom apartments. Anonymizing the corresponding records together helps to maintain the information that a portion of the population has lived for many years in one-bedroom apartments.

It is understood that the ranking at step 108 results in an ordered list "L" of records. Continuing, at step 112, FIG. 3, after the records have been ranked based on the selected cost function F, a loop 150 is entered which consists of several steps: First, selecting or designating at least k (or more) top-ranked records from list L which were sorted based on cost function F as ordered list "L" of records, where k is representative of a minimum level of anonymity. These records will be anonymized together and form an anonymization group $G_i$. In an embodiment, it is understood that k or more than k records may be selected at this point. This may have a positive effect on the resulting anonymization for the sequences-of-sequences part, by reducing the overall information loss.

It is understood that an embodiment in which more than k records are selected may have a positive effect on the resulting anonymization for the sequences-of-sequences part, by reducing the overall information loss.

At step 115, FIG. 3, the method further includes anonymizing the relational part of the records in $G_i$. Techniques for k-anonymizing data, such as clustering-based techniques, can be used for anonymizing the relational part of the records in $G_i$.

At step 120, FIG. 3, the method includes anonymizing the sequential part of the records in $G_i$. It should be understood that the steps 115, 120 do not have to be performed in the sequence as shown, i.e., step 120, may precede step 115. Alternatively, an iterative loop 150 comprising steps 112-130 of the method 100 may be with anonymizing the relational part 115 of the data only; and then, when the loop 150 is finished, the loop is run again anonymizing the sequential part 120 of the data; or vice versa.

In one embodiment, a data processing system including a programmed processor device performs a method for anonymizing the relational part data at 115. It is understood that the records of the relational part of the records in $G_i$ are of similar size as discussed above, e.g., when ranked (or sorted) based on a number sequence elements. In this step, sequences of the same size are processed and respective elements of each sequence are generalized.

Figure 4A:
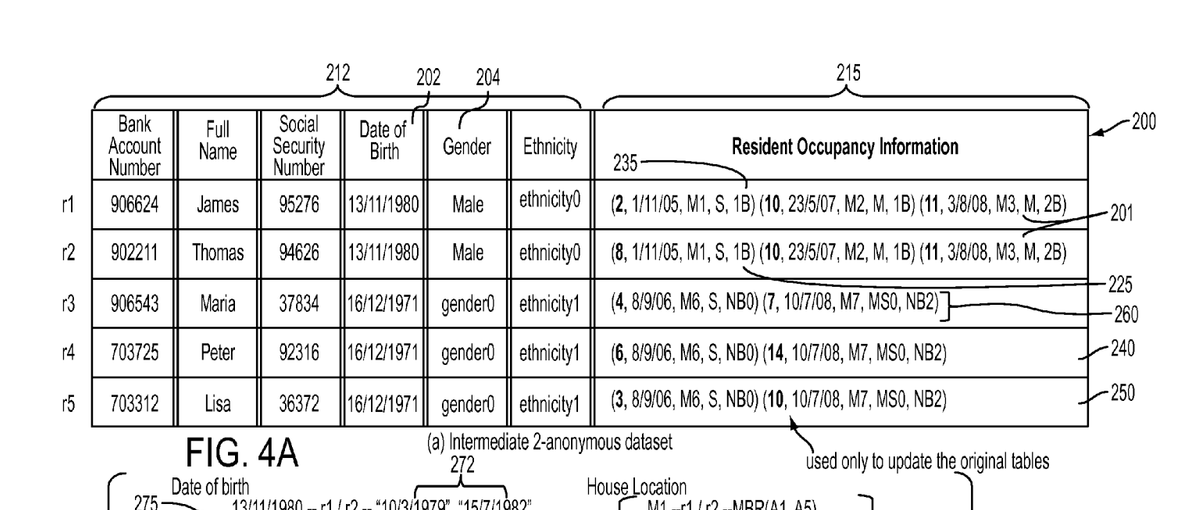
FIG. 4A shows an example intermediate anonymized dataset with equivalence classes [r1,r2] and [r3, r4, r5]

FIG. 4A shows an example intermediate anonymized data set 200 having anonymized relational part and sequential parts. In the anonymization of the sequential part 215, for the first two records r1 and r2 there is shown the sequence elements of a sequence 225 of the second record r2 generalized as the corresponding sequence elements of the sequence 235 of the first record r1. Similarly, each of the remaining sequences 201 in second record r2 have sequence elements that have been generalized to match the data of the respective sequence elements of the corresponding remaining sequence elements in first record r1. Similarly, in the example intermediate anonymized dataset 200 of FIG. 4A, each sequence element (of each respective sequence of the sequences 240) in the fourth record r4 and each sequence element (of each respective sequence of the sequences 250) in the fifth record r5 have been matched to, i.e., generalized to the same values as, the corresponding sequence elements of each respective sequence of the corresponding sequences 260 of the third record r3 on the ranked list L (as they are of the same size in the list). This anonymizing process is repeated for each of the records in the list L of like size.

In the anonymization of the relational part 212, the quasi-identifying attributes for the individuals are further anonymized to protect identity of individuals in the example intermediate set (of group $G_i$ records).

Figure 4B:
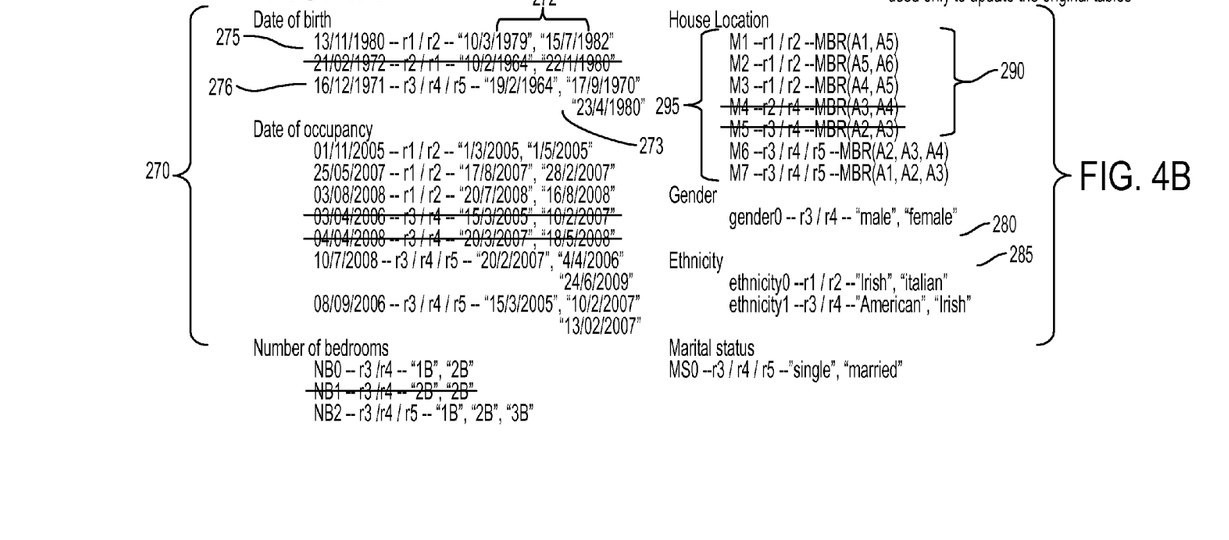
FIG. 4B shows the example produced mapping tables which are returned together with the anonymized relational tables.

For example, in FIG. 4A, the method anonymizes the quasi-identifying attribute "date of birth" 202 for the first two records with an intermediate value being generalized, e.g., 13/11/1980. The example mappings 270 of FIG. 4B show the original date of birth values 272 for the individuals as provided from original dataset record r1 and record r2, with its corresponding mapped generalized value 275, e.g., 11/13/80. This is the replaced value in the data of birth attribute in the anonymized data set of FIG. 4A for those two individuals in records r1/r2. FIG. 4B further shows in the mapping table 270 the anonymized date of birth value 276 generated based on the original date of birth values 273 for the individuals and generalized for each of the three records r3/r4/r5 of Table 200.

As further shown in FIG. 4A, in the anonymization of the quasi-identifying attribute "Gender" 204 are not necessary for the individuals represented in records r1/r2 as they are already the same (e.g., Male). However, a generalized value is provided (e.g., gender0) for the individuals represented in records r3/r4/r5 as an anonymized value for these individuals. FIG. 4B shows in a generated mapping table the anonymized gender value (gender0) for a male or female value for the individuals in records r3/r4/r5 of Table 200. FIG. 4B also shows the process in which these mapping tables are constructed by depicting their content in the course of the execution of the method 100. In FIG. 4B, entries with a strikethrough correspond to temporary information that is stored in the mapping table, which is afterwards deleted, leaving the non-strikethrough entries as the final contents of the respective mapping tables.

Further, in FIG. 4A, in the anonymization of the quasi-identifying attribute "Ethnicity" 206 there is shown for the individuals represented in records r1/r2 an anonymized value "ethnicity0" while for the individuals represented in records r3/r4/r5 as shown in Table 200, their ethnicity values are anonymized to a value "ethnicity1". The example mapping table of FIG. 4B shows the original ethnicity values for the respective individuals, e.g., ethnicities 280 in records r1/r2 and ethnicities 285 in records r3/r4/r5, with their generalized values ethnicity0 and ethnicity1, respectively.

In one implementation, for the anonymization performed at 115, the system and methods determine, from the intermediate dataset records such as shown in FIG. 4A, for each quasi-identifying attribute "A", whether all records in $G_i$ have the same value for a particular attribute. If all records in $G_i$ have the same value for this attribute, then no action is taken. Otherwise, the method includes determining:

a) If attribute A is a numerical attribute, then applying an aggregate function $f_A$ to the values of the records in group $G_i$. For example, if A is age, then the mean of the ages of the k individuals in group $G_i$ may be computed. The corresponding value of function $f_A$ replaces the original value in all these records.

b) If attribute A is of type date or timestamp, then the attribute is handled similarly to the case of a numerical attribute, where function $f_A$ is computed accordingly. It is observed that modern DBMS include a plethora of functions for handling dates and timestamps, thus computing aggregates on such data values is a simple operation.

c) If attribute A is categorical, then the method includes creating a new categorical value which does not belong to the original domain of A. This new created value replaces the original value of attribute A in the records that belong to group Gi. For example, if A is gender and there are some records in Gi that have gender="male" and others that have gender="female", then a value, say gender0, is created and replaces values "male" and "female" in all records of group Gi.

In a further embodiment, aggregate functions $f_A$ can be produced for more complex data types. For example, the method and system herein additionally considers the case of BLOBs (Binary Large Objects), where a file that is connected to an original data record is replaced with an (zip/rar/tar/etc.) archive, containing all the files of the records in Gi.

Generally, in one implementation, for the anonymization of the sequential part performed at 120, the system and methods determine, from the intermediate dataset records of FIG. 4A the following: If all records in Gi have the same sequence S, i.e., they are indistinguishable from one another in terms of their sequential part, then no further action is taken. Otherwise, the following actions are taken:

Letting $l_{min}$ be the length of the smallest sequence S in group Gi, for each sequence S of a record in group Gi with a length greater than $l_{min}$, pairs of consecutive elements $s_i$ of this sequence are aggregated until its size is reduced to $l_{min}$. This, for example, may occur in an iterative fashion; at each step, the two most similar consecutive elements are selected and aggregated. A cost function F' can be used to measure the similarity of two (consecutive) elements $s_{i,x}$, $s_{i(x,i)}$ based on the similarity of (some of) the corresponding events of these elements. In one embodiment, when the most similar pair of consecutive elements is identified, these elements are aggregated either using the same aggregate functions $f_A$ that were used in the relational part, or by using different aggregate functions $g_A$.

As an option forming an alternative embodiment, a sequence alignment operation, followed by event suppression, may be used.

As an example, consider that records of group $G_i$ include records r2 and r3 of FIG. 1A. In this case $l_{min}$=2, and the algorithm needs to condense record 2 up to the point that it contains 2 elements. This can be achieved by aggregating $s_{21}$=(8,1/5/2006,A6,S,1B) with $s_{22}$=(10,17/8/2007,A5,M,2B). Alternately, the method may perform aggregating sequence $s_{22}$ with $s_{23}$=(11,16/8/2008,A4,M,2B). Assume that the cost function F' takes into account the date of occupancy, the marital status of the individual, and the number of bedrooms of the house (i.e., events 2, 4 and 5). Then, it will select to aggregate $s_{22}$ with $s_{23}$. After the aggregation, record 2 will have two elements: i.e., (8,1/5/2006,A6,S,1B) and an aggregated: ({10,11},{17/8/2007-16/8/2008},{A5,A4},M,2B). In one embodiment, as described herein, assuming that the aggregate function for dates uses the mean value of the dates, then record 2 will be (8,1/5/2006,A6,S,1B) ({10,11},17/2/2008,{A5,A4},M,2B).

When all sequences in $G_i$ have the same length (i.e., $l_{min}$), they are aggregated together index-wise; i.e., the first elements $s_{i1}$, for all sequences i in $G_i$, are aggregated using the same aggregate function as in the previous step. Then the same happens for the second elements $s_{i2}$ and so on, for the rest of the elements. This leads to a common sequence S that is assigned to each record of $G_i$.

As an example, consider record r3 and the condensed record r2 (produced in the example of aggregating records 2 and 3 in the prior step). Both records have now a length of 2. Their aggregation will lead to a new sequence S that will be assigned to both records: (14,81,21/9/2006,{A6,A1},S,1B) ({7,10,11},16/7/2008,{A3,A4,A5},M,{2B,3B}). In one implementation, if the considered aggregate function handles also location coordinates, then the coordinates of houses in different records may be replaced with their Minimum Bounding Rectangle (MBR). This option is provided by some DBMS that inherently support spatial data as well as several operations that can be applied to such data, including the computation of the MBR of a set of points (geometries). As an example, houses A1 and A6 can be replaced in records r2 and r3 with their MBR(A1,A6) 29, as shown in FIG. 1B. The method anonymizes the original MBR values 290 for some of the individuals with generalized values 295.

Following all previous steps, the records in $G_i$ are now rendered k-anonymous. Returning to step 125, FIG. 3, the mappings that were produced through the various generalization actions and that were enforced in the previous steps (i.e., in order to anonymize the records) are stored in a new set of tables, referred to as mapping tables, such as the tables shown in FIG. 5.

Figure 5:
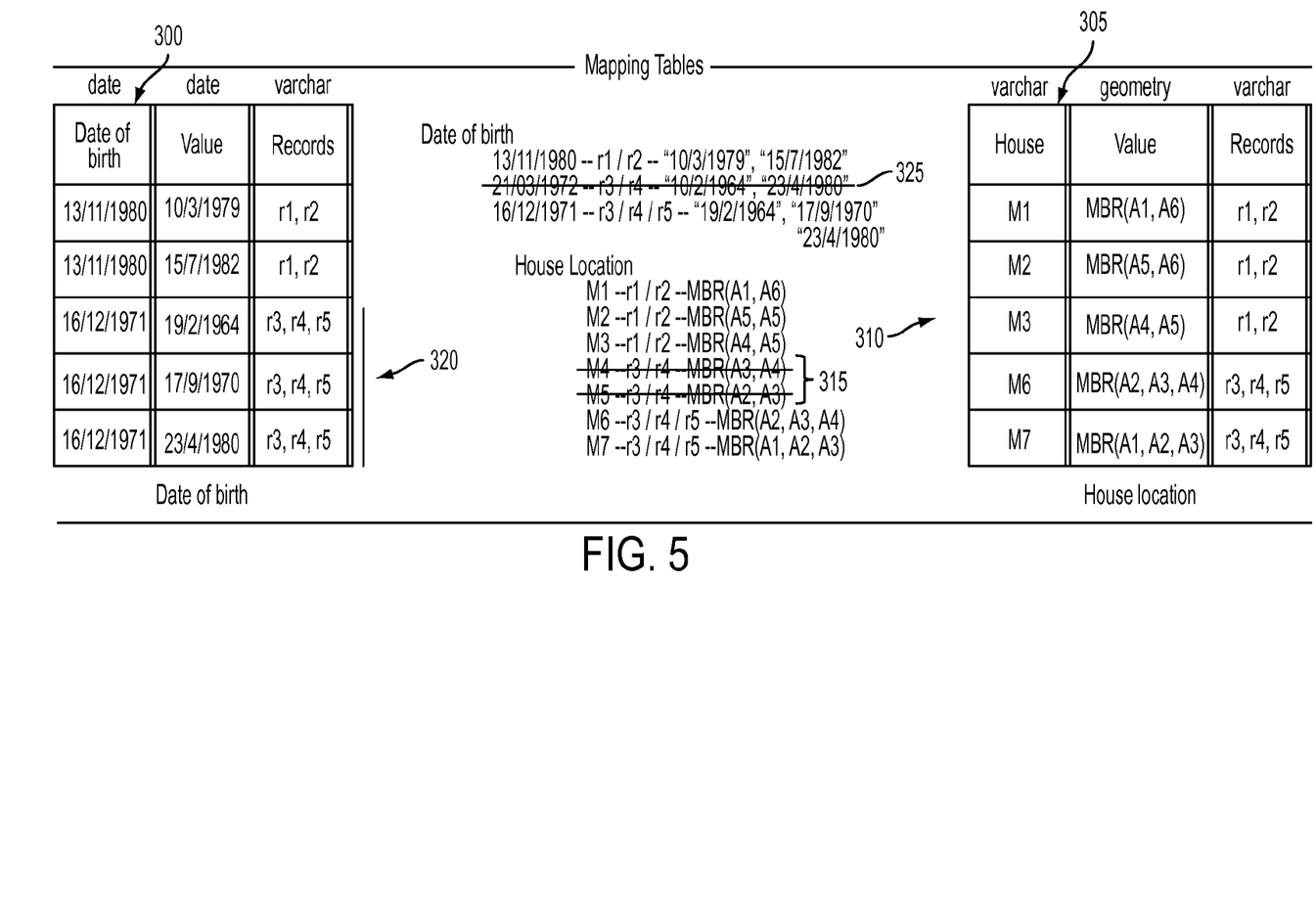
FIG. 5 illustrates an example of two mapping tables: for a date-of-birth and for a house-location information produced as part of the anonymization process.

FIG. 5 shows an example of mapping tables that are produced by the data anonymization method and are subsequently stored as (regular) relational tables in the database. The example two mapping tables include table 300 for the date-of-birth and table 305 for the house-location information), produced as part of the anonymization process and stored in the database as (regular) relational tables.

Specifically, for each record r that was generalized using the method, the following information is maintained in the mapping table: 1) the new/generalized value of the attribute, e.g. gender0; the set of affected records, which now contain this value (e.g., r1, r2, etc.); the assigned original values to this generalized value (e.g., "male", "female"), e.g., presented in a (lexicographically) sorted order or in a random order. If the values are presented in a way that always (or frequently) preserves their order in the corresponding records, then the offered anonymity can be breached. Thus, it is required that the original values are not given in an order-preserving way, e.g., they are presented either in a random order or lexicographically sorted.

As new generalization actions are taken by the method (i.e., since the generalization operations continue in the loop 150 of FIG. 3), the values of the mapping tables are updated accordingly. FIG. 4B illustrates the mapping tables for the example anonymizing dataset 200 of FIG. 1.

Returning to FIG. 3, at step 130, the records comprising group $G_i$ are removed from list L as they have been rendered anonymous. The loop continues by producing the next group $G_i$ using the remaining records in list L, until the list L includes less than k records. When the method determines that the next group $G_i$ includes less than k records, the method exits the loop at 131 and proceeds to step 135. At 135, the method performs selecting a record r from each group $G_i$ that was produced and uses the cost function F to compute the similarity of record r to each record remaining in list L. The record from list L is subsequently assigned to the group that contains the most similar record r. The selection of record r varies based on the actual implementation of the method. In one embodiment of the method, record r is selected as the most representative record of group Gi.

The records from list L that were assigned to groups of anonymous records are anonymized together with the records of the corresponding groups as indicated at 140, FIG. 3. The anonymization is achieved using steps 115 and 120 (i.e., as before) and the mapping tables are updated accordingly (at step 125).

For the mapping, if the value of the record appears as part of a previously generalized value (e.g., gender0 already contains "male" and "female", and the new record has "male") then the same generalized value is assigned to the record. Otherwise, a new generalization is produced for this record and is enforced to all records of the same group. Moreover, existing entries from the mapping table that conflict with this generalization are removed from the mapping table and the new generalization is added. An example of the removed entries are shown in the mapping 310 generated for table 305 shown in FIG. 5 where the stricken entries 315 conflict with a generalization; and similarly as a removed entry shown in the mapping 320 generated for table 300 where the stricken entry 325 conflicts.

At this point, all the records of the intermediate dataset have been rendered anonymous. As a final step, the corresponding original tables in the database, i.e., the tables 30, 32, 34 from which the intermediate original dataset was produced (e.g., see FIG. 2A), are updated accordingly, i.e., the anonymous/sanitized records replace the corresponding original records in these tables.

In one embodiment, the system generates as output: 1) the anonymized dataset in the form of relational tables; and 2) computed mappings stored as relational tables.

These relational tables can now be safely shared as individuals' privacy is protected from attackers who have the considered background knowledge.

An illustrative example is now presented:

Considering the three relational tables shown in FIGS. 2A-2C, these tables contain details about the special housing program of a fictitious city from electronically stored residency records. In particular, Table 30 includes person-specific details about individuals who live in special houses, while Table 32 displays rent transaction information, including the bank account, the last transaction date and amount, as well as the balance of each individual. Table 34 includes property details about the houses and their current occupancy. As it is evident from the data, Table 30 contains static information, while Tables 32 and 34 contain information that is dynamic in nature.

Assuming that a privacy-protected version of these datasets needs to be shared with untrusted parties, anonymizing each table individually is insufficient to guarantee privacy, particularly because (a) it implicitly assumes individuals who know record-specific information only from the corresponding table, and (b) it assumes that joins of the k-anonymous counterparts of these tables cannot lead to less than k records.

However, the method, identifies the static and dynamic information of the electronically stored records in the three tables and summarizes them in the intermediate dataset, shown in FIG. 1A. In this table, a record consists of a relational part and a sequential part, the latter of which may contain sequences of sequences.

Using the method, the explicit identifiers in the table are either suppressed or masked. Assuming that there are available masking providers for each of these types of attributes, the masked values are obtained as shown in FIG. 4A.

Following that, the records are ranked using a cost function F at 108. In one embodiment, this function attempts to maintain (to the maximum possible extent) the length of the sequences (i.e., the resident occupancy information) for the individuals. Thus, the records of the intermediate table are ranked in decreasing length of their sequences S. The resulting ordering is as shown in FIG. 1A, i.e. records r1, r2, . . . , r5. Further, assume that 2-anonymity (i.e., k=2) is sought.

Based on step 115 of the proposed method, the first two records are selected to be anonymized together. To anonymize the relational part, the following aggregate functions are considered:

$f_{dob}$=randomized-average (dates of birth);

$f_{gender}$=genderW containing the union of the corresponding original values;
$f_{ethnicity}$=ethnicityX containing the union of the corresponding original values.

In one example, the randomized-average(dates of birth) are the actual average of the dates shifted by a random number of days.

Similarly, to anonymize the sequential part, the following aggregate functions are considered:
$g_{occupancy\text{-}date}$=randomized-average(occupancy dates);
$g_{house\text{-}location}$=MBR(house locations);
$g_{marital\text{-}status}$=mstatusY containing the union of the corresponding original values;
$g_{num\text{-}bedrooms}$=nbdrmsZ containing the union of the corresponding original values.

After anonymizing the two records across each part, the mapping tables are updated accordingly as shown in FIG. 4B. Then, these records (which form group $G_1$) are removed from list L and the method continues to examine the next two records, i.e., record r3 and record r4. These records are anonymized in a similar fashion and form a group, e.g., group $G_2$. At this point, there is only one record (i.e., record r5) left in list L. Since k=2, this record will have to be assigned to the most similar group, i.e., either $G_1$ or $G_2$. Because the cost function F is based on the length of the sequences, record 5 will have to be assigned to group $G_2$.

To anonymize the record, the function $f_{dth}$ is used to compute the date. Then, to protect the gender information, because gender0 already contains value "female", the method replaces the original value with gender0. An alternative would be to create the new value gender1 and replace the value of gender in all records of $G_2$ (including record r5) with gender1. Then, gender0 would be detected from the corresponding mapping table to maintain consistency. Similarly, for the case of ethnicity, since ethnicity1 contains "American", the corresponding value of record r5 can be replaced with value ethnicity1.

The sequential part of the dataset is updated in a similar fashion. FIG. 4 illustrates the 2-anonymous dataset that is produced by the method. As one can observe, the inclusion of the new record to the already anonymous group $G_2$, constitutes certain entries of the mapping tables outdated; these entries have to be deleted (are shown as stricken in FIG. 4B), in order to maintain consistency. The intermediate anonymous dataset can be subsequently used to update the corresponding relational tables of FIG. 2, which can be safely released to untrusted third parties together with the mapping tables. In fact, the sequence IDs of the records (shown in bold in the intermediate dataset of FIG. 4A) are used only to help update the original relational tables in the database and are not released.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 6:
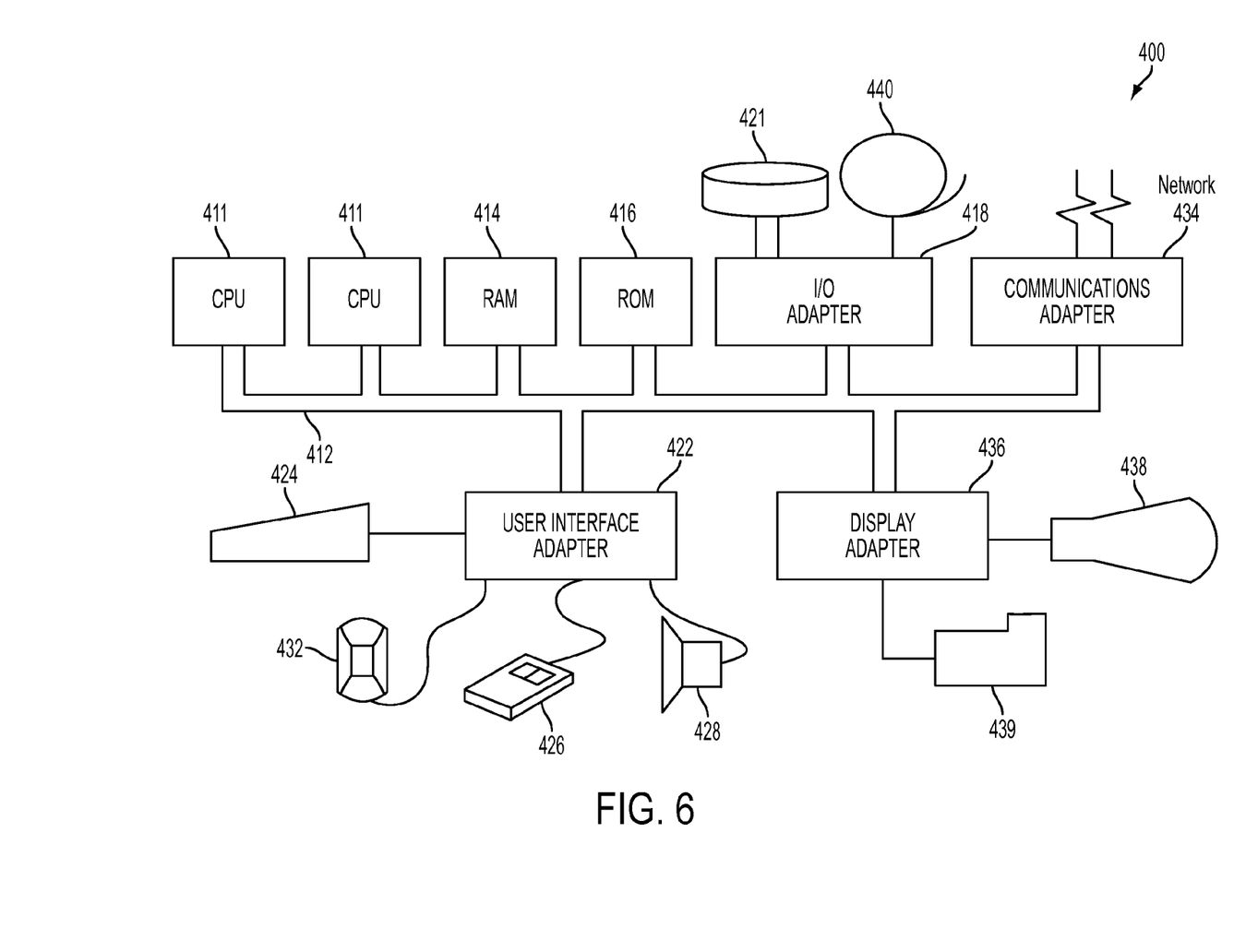
FIG. 6 illustrates a portion of a computer system, including a CPU and a conventional memory in which the present invention may be embodied.

FIG. 6 illustrates one embodiment of an exemplary hardware configuration of a computing system 400 programmed to perform the method steps described herein with respect to FIG. 3. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 3, the flowchart and block diagrams in the Figure illustrates the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method of anonymizing data comprising:
receiving at a hardware processor, input comprising a dataset having both a relational data part and a sequential data part, the sequential part is data representing a sequence-of-sequences in which a sequence comprises elements that are sequences;
identifying from said dataset direct identifier attributes corresponding to entities;
masking or suppressing attribute values corresponding to said identified direct identifier attributes;
ranking records based on a similarity with respect to a defined cost function F;
selecting and iteratively anonymizing each set of at least k first records as ranked using the defined cost function F, each set of at least k records comprising a group, said anonymizing attribute values along both the relational part and the sequential part, wherein k is a specified k-anonymization parameter; and
repeating said selecting and iteratively anonymizing each successive set of at least k records of successive groups said anonymizing attribute values along both the relational part and the sequential part of records therein to generate anonymized table representations of said dataset resulting from said anonymization, and
outputting said anonymized table representations to an output device, said anonymized table representations guaranteeing no attacker can re-identify the direct identifier attributes of any entity in the dataset with a certain probability.

2. The method as claimed in claim 1, wherein said dataset comprises:
data from a set of relational data tables, one or more said relational data tables having one or more multiple time-ordered records for an entity forming the sequential part, each record having a set of attributes; and at least two tables having one record per entity forming the relational part, each record having a further set of attributes, said method further generating, by said hardware processor, an intermediate representation of the dataset having both the relational data part and the sequential data part.

3. The method as claimed in claim 2, further comprising:
determining if any further records for an entity remain after said repeating said anonymization; and if so, for each remaining record, determining a relevant anonymous group for the remaining record, and assigning the remaining record to the most relevant anonymous group.

4. The method as claimed in claim 3, further comprising:
determining, for each record of the group: whether an attribute A is a numerical attribute value; and
applying an aggregate function $f_A$ to numerical attribute values of the records in said group;
replacing a corresponding value of function $f_A$ for an original value in the records.

5. The method as claimed in claim 4, wherein the applying an aggregate function $f_A$ to the numerical attribute values includes one or more of:
computing a mean of ages of some or all k individuals in said group; or
computing a mean or a randomized-average of recorded date or time stamp events of some or all k individuals in said group.

6. The method as claimed in claim 3, further comprising:
determining, for each record of the group: whether an attribute A is a categorical attribute; and
applying an aggregate function $f_A$ to categorical attribute values of the records in said group;
replacing a corresponding value of function $f_A$ for the original value in the records.

7. The method as claimed in claim 6, wherein the applying an aggregate function $f_A$ to said categorical attribute values includes one or more of:
creating a new categorical value which does not belong to a domain of the attribute A; and replacing the original value of attribute A with the new created value for the records that belong to said group.

8. The method as claimed in claim 1, wherein said anonymizing attribute values along both the relational part and the sequential part generates anonymized attribute values, said method further comprising:
generating a mapping table, said mapping table mapping original attribute values of a dataset table with said anonymized attribute values.

9. The method as claimed in claim 8, further comprising:
storing the resulting anonymized tables of the data set in their original form, along with their corresponding mapping tables.

10. The method as claimed in claim 8, wherein said ranking comprises: quantifying, using a first cost function, a similarity between two records; and optionally using a second cost function for quantifying the similarity of two elements/sequences.

11. The method as claimed in claim 1, further comprising:
identifying from the dataset quasi-identifier attributes of said entities; and, masking or suppressing attribute values of said quasi-identifier attributes.

12. The method as claimed in claim 1, wherein said anonymized table representations protect data in the dataset from attackers who know one or more of: values of all explicit identifiers of an individual or entity; values of all quasi-identifying relational attributes of the individual or entity; a sequence of the individual or entity; and the number of elements for an individual record.

13. A system for anonymizing data comprising:
a memory;
a hardware processor coupled to the memory for receiving instructions configuring said hardware processor to perform a method comprising:
receiving an input comprising a dataset having both a relational data part and a sequential data part, the sequential part is data representing a sequence-of-sequences in which a sequence comprises elements that are sequences;
identifying from said dataset direct identifier attribute values corresponding to entities;
masking or suppressing attribute values corresponding to said identified direct identifier attributes;
ranking records based on a similarity with respect to a defined cost function F;
selecting and iteratively anonymizing each set of at least k first records as ranked using the defined cost function F, each set of at least k records comprising a group, said anonymizing attribute values along both the relational part and the sequential part, wherein k is a specified k-anonymization parameter;
repeating said selecting and iteratively anonymizing each successive set of at least k records of successive groups said anonymizing attribute values along both the relational part and the sequential part of records therein to generate anonymized table representations of said dataset resulting from said anonymization, and
outputting said anonymized table representations to an output device, said anonymized table representations guaranteeing no attacker can re-identify the direct identifier attributes of any entity in the dataset with a certain probability.

14. The system as claimed in claim 13, wherein said dataset comprises:
data from a set of relational data tables, one or more relational data tables having one or more multiple time-ordered records for an entity forming the sequential part, each record having a set of attributes; and at least two tables having one record per entity forming the relational part, each record having a further set of attributes, the method further comprising:
generating, by said hardware processor, an intermediate representation of the dataset having both the relational data part and the sequential data part.

15. The system as claimed in claim 14, said hardware processor configured to further perform:
determining if any further records for an entity remain after said repeating said anonymization; and if so, for each remaining record, determining a relevant anonymous group for the remaining record, and assigning the remaining record to the most relevant anonymous group.

16. The system as claimed in claim 13, wherein said anonymizing attribute values along both the relational part and the sequential part generates anonymized attribute values, said method further comprising:
generating a mapping table, said mapping table mapping original attribute values of a dataset table with said anonymized attribute values; and,
storing the resulting anonymized tables of the data set in their original form, along with their corresponding mapping tables.

17. The system as claimed in claim 13, wherein said anonymized table representations protect data in the dataset from attackers who know one or more of: values of all explicit identifiers of an individual or entity; values of all quasi-identifying relational attributes of the individual or entity; a sequence of the individual or entity; and the number of elements for an individual record.

18. A computer program product comprising:
a computer readable storage medium, said medium not a propagating signal, said medium tangibly embodying a program of instructions executable by the computer for anonymizing data, said program of instructions, when executing, configuring the computer to perform a method comprising:
receiving an input comprising a dataset having both a relational data part and a sequential data part, the sequential part is data representing a sequence-of-sequences in which a sequence comprises elements that are sequences;
identifying from said dataset direct identifier attributes corresponding to entities;
masking or suppressing attribute values corresponding to said identified direct identifier attributes;
ranking records based on a similarity with respect to a defined cost function F;
selecting and iteratively anonymizing each set of at least k first records as ranked using a cost function F, each set of at least k records comprising a group, said anonymizing attribute values along both the relational part and the sequential part, wherein k is a specified k-anonymization parameter; and
repeating said selecting and iteratively anonymizing each successive set of at least k records of successive groups said anonymizing attribute values along both the relational part and the sequential part of records therein to generate anonymized table representations of said dataset resulting from said anonymization, and
outputting said anonymized table representations to an output device, said anonymized table representations guaranteeing no attacker can re-identify the direct identifier attributes of any entity in the dataset with a certain probability.

19. The computer program product as claimed in claim 18, wherein said data set comprises data from a set of relational data tables, one or more relational data tables having one or more multiple time-ordered records for an entity forming the sequential part, each record having a set of attributes; and at least two tables having one record per entity forming the relational part, each record having a further set of attributes, said hardware processor configured to further perform:
   determining if any further records for an entity remain after said repeating said anonymization; and if so, for each remaining record, determining a relevant anonymous group for the remaining record, and assigning the remaining record to the most relevant anonymous group.

20. The computer program product as claimed in claim 18, wherein said anonymized table representations protect data in the dataset from attackers who know one or more of: values of all explicit identifiers of an individual or entity; values of all quasi-identifying relational attributes of the individual or entity; a sequence of the individual or entity; and the number of elements for an individual record.

* * * * *